US012110832B2

(12) United States Patent
Marrack et al.

(10) Patent No.: US 12,110,832 B2
(45) Date of Patent: Oct. 8, 2024

(54) FUEL INJECTOR CONTROL SYSTEM AND METHOD

(71) Applicant: Caterpillar Inc., Peoria, IL (US)

(72) Inventors: Andrew O. Marrack, Peoria, IL (US); Mitchell B. Juchems, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/817,036

(22) Filed: Aug. 3, 2022

(65) Prior Publication Data

US 2024/0044299 A1 Feb. 8, 2024

(51) Int. Cl.
*F02D 41/20* (2006.01)
*F02D 41/40* (2006.01)

(52) U.S. Cl.
CPC ........... *F02D 41/20* (2013.01); *F02D 41/401* (2013.01); *F02D 2041/2048* (2013.01); *F02D 2041/2055* (2013.01); *F02D 2041/2058* (2013.01)

(58) Field of Classification Search
CPC ................... F02D 41/20; F02D 41/401; F02D 2041/2041; F02D 2041/2048; F02D 2041/2058
See application file for complete search history.

(56) References Cited

U.S. PATENT DOCUMENTS 5,634,448 A 6/1997 Shinogle et al.
5,986,871 A 11/1999 Forck et al.
6,311,667 B1 * 11/2001 Satou .................. F02D 13/0261 123/295
6,684,853 B1 * 2/2004 Lei ....................... F02M 57/025 123/496
7,469,679 B2 12/2008 Puckett et al.
7,917,310 B2 * 3/2011 Pearce .................... F02D 41/20 702/38
9,719,457 B2 8/2017 Moonjelly et al.
11,230,990 B2 1/2022 Puckett et al.
11,293,370 B1 4/2022 Puckett et al.
11,795,887 B1 * 10/2023 Juchems ................ F02M 51/00
2006/0124108 A1 * 6/2006 Puckett ................... F02D 41/20 123/446
2008/0092853 A1 * 4/2008 Harcombe ............ F02D 41/401 123/472
2010/0096473 A1 * 4/2010 Coldren ............. F02M 63/0063 239/90
2021/0207554 A1 * 7/2021 Marrack ............... F02D 41/345

* cited by examiner

*Primary Examiner* — Logan M Kraft
*Assistant Examiner* — Johnny H Hoang
(74) *Attorney, Agent, or Firm* — Bookoff McAndrews, PLLC

(57) ABSTRACT

A fuel injection installation method includes detecting an actuation timing of a first valve of a fuel injector, detecting an actuation timing of a second valve of the fuel injector, detecting a return timing of the first valve of the fuel injector, and detecting a return timing of the second valve of the fuel injector. The method includes, for one or more fuel injection events, modifying at least one of: a maximum amplitude of solenoid current, an average amplitude of solenoid current, a start time of solenoid current, an end time of solenoid current, or a total time of solenoid current. The modification is based on the actuation timing of the first valve, the actuation timing of the second valve, the return timing of the first valve, and the return timing of the second valve, and may be performed for installation of the fuel injector.

20 Claims, 3 Drawing Sheets

FUEL INJECTOR CONTROL SYSTEM AND METHOD

TECHNICAL FIELD

The present disclosure relates generally to methods and systems for internal combustion engine components and, more particularly, to systems and methods for a fuel injection system with multiple solenoids.

BACKGROUND

Fuel injectors for internal combustion engines are precisely-manufactured devices that generally provide accurate control over quantity and timing of fuel injection. Current manufacturing techniques can produce injector components that typically perform suitably. Despite this, the high-precision injectors used in many applications are subject to manufacturing tolerances. These manufacturing tolerances can impact various aspects of the operation of the fuel injector, including valve travel times, valve travel distance, electrical characteristics of the injector, etc., which can result in different injection amounts and different injection timings when injectors of the same type are exposed to the same electrical control signals.

Some fuel injection systems are designed to compensate for manufacturing tolerances and/or other causes of variability among otherwise-identical injectors. One method for reducing differences between injectors involves significant testing, sometimes referred to as "end-of-line" testing, to evaluate individual fuel injectors under different conditions. Based on the results of these tests, programming can be generated for an engine control unit to improve the operation of the injector by compensating for this injector's unique performance. This programming can be in the form of trim codes, or trim files, that can be loaded to a memory of the electronic control unit by an operator or by service personnel.

To use trim codes or trim files, a user must accurately identify the fuel injector being installed, retrieve the trim code which may be in the form of an electronic document that is accessed over the internet, and load the correct trim code onto memory for the engine control unit. This must be repeated for each individual injector of the engine, which can include twenty injectors or more. This process can be time consuming and, in some cases, can be the source of undesired engine performance when a user programs the control unit with the incorrect trim file or fails to update the programming of the control unit when new injectors are installed.

An exemplary fuel system is described in U.S. Pat. No. 9,719,457 B2 ("the '457 patent") to Moonjelly et al. The fuel system described in the '457 patent can determine a start of fuel injection. This determination is made based on pressure information generated with in-cylinder pressure sensors. Based on these pressure measurements, the system described in the '457 patent can adjust injector timing. While the system disclosed in the '457 patent may be useful in some circumstances, it is not able to replace fuel injector trim codes, and uses a factor external to the fuel injector, cylinder pressure, which can be impacted by factors other than the actual operation of the fuel injector itself.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a fuel injection installation method may include detecting an actuation timing of a first valve of a fuel injector, detecting an actuation timing of a second valve of the fuel injector, detecting a return timing of the first valve of the fuel injector, and detecting a return timing of the second valve of the fuel injector. The method may include, for one or more fuel injection events, modifying at least one of: a maximum amplitude of solenoid current, an average amplitude of solenoid current, a start time of solenoid current, an end time of solenoid current, or a total time of solenoid current. The modification may be based on the actuation timing of the first valve, the actuation timing of the second valve, the return timing of the first valve, and the return timing of the second valve, and may be performed for installation of the fuel injector.

In another aspect, a fuel injection system may include a mechanically-actuated fuel injector, the fuel injector having a first electronically-controlled valve, a second electronically-controlled valve, and a nozzle configured to inject fuel. The fuel injection system may also include an electronic control module configured to, without the use of a fuel injector trim file, identify an actuation timing of a spill valve based on actuation current, identify an actuation timing of a control valve based on actuation current, identify a return timing of the spill valve based on induced current, identify a return timing of the control valve based on induced current, and modify a current timing for the spill valve and for the control valve in a subsequent injection based on the identified actuation timings and the identified return timings.

In yet another aspect, a fuel injector control module may include a memory storing instructions and one or more processors that, when executing the instructions, are programmed to performs functions including detecting an actuation timing of a first valve of a fuel injector, detecting an actuation timing of a second valve of the fuel injector, detecting a return timing of the first valve of the fuel injector, and detecting a return timing of the second valve of the fuel injector. The functions may also include, for one or more future fuel injection events, changing at least one of a maximum amplitude of solenoid current, an average amplitude of solenoid current, a start time of solenoid current, an end time of solenoid current, or a total time of solenoid current. The change may be based on the actuation timing of the first valve, the actuation timing of the second valve, the return timing of the first valve, and the return timing of the second valve.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
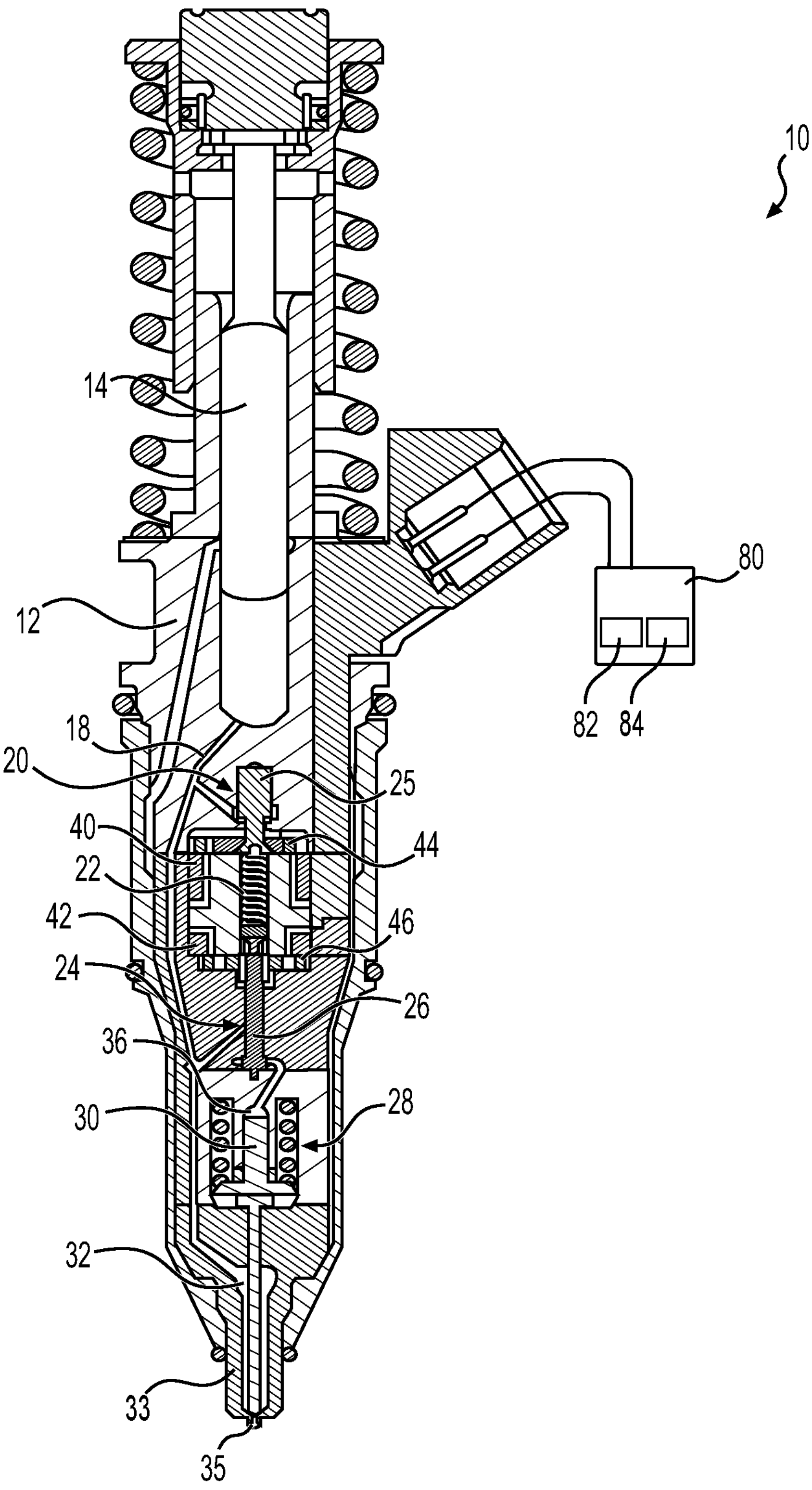
FIG. 1 is a schematic cross-sectional view of a fuel injection system, according to aspects of the disclosure.

FIG. 1 illustrates an exemplary fuel injector control system (also referred to as "fuel injection system") 10 according to aspects of the present disclosure. Fuel injection system 10 may include a plurality of fuel injectors 12 installed in an internal combustion engine, and an electronic control module (ECM) 80 connected to each injector 12. Fuel injector 12 may include a plurality of valves, these valves being responsive to commands generated with ECM 80, as described below.

Each fuel injector 12 may be a mechanically-actuated electronically-controlled unit injector including a body that houses a cam-driven piston 14, a fuel passage 18 to receive pressurized fuel, a spill valve 20, a control valve 24, and an injection valve 28. Spill valve 20 may be a normally-open valve including a valve member 25 that is movable between an open position and a closed position. A spring member 22 may act to bias spill valve member 25 to the open position. When the valve member 25 is in the open position, spill valve 20 may allow fuel to drain and return to the fuel supply system. When spill valve member 25 is in the closed position, spill valve 20 may enable pressurization of fuel via the piston of injector 12. Spill valve may include a spill valve solenoid 40 for actuating spill valve member 25 due to movement of a spill valve armature 44 to which member 25 is connected. Spill valve solenoid 40 may be energized in response to commands from ECM 80, the energized state generating a magnetic field to move spill valve 20 to the closed position via spill valve armature 44.

Control valve 24 may be connected between pressurized fuel supply passage 18 and a control chamber 36. Control valve 24 may have a non-injection position and an injection position associated with a control valve member 26. When in the non-injection position, control valve member 26 may enable fluid communication between control chamber 36 and fuel that is pressurized with piston 14, blocking control valve member 30 with fuel in control chamber 36. When control valve member 26 is in the injection position, control chamber 36 may be depressurized by allowing fuel in chamber 36 to drain from fuel injector 12 to the fuel supply system. Control valve 24 may be brought to the injection position due to electromagnetic force created by supplying current to control valve solenoid 42.

Injection valve 28 may be a one-way mechanical valve formed with a spring, a needle valve member 30 biased by the spring to a closed position, and control chamber 36. Valve member 30 may extend to a distal end of injector 12 that forms a nozzle 33 that terminates in injector openings 35. Injector openings 35 of nozzle 33 may be opened and closed by the end of valve member 30. When high-pressure fluid is present in control chamber 36, valve member 30 may be secured in a closed position, even when pressurized fuel is present in injection chamber 32. When injection is desired, fluid may be permitted to drain from control chamber 36, as described below, allowing pressurized fuel to lift valve member 30 by acting on the lower surface of control valve member 30.

ECM 80 may be a fuel injector control module that controls one or more aspects of system 10, including the behavior of an internal combustion engine and, if desired, behavior of one or more systems of a machine in which system 10 is located. ECM 80 may include a memory 82 and one or more processors 84 to perform the functions described herein. ECM 80 may be implemented as a single control unit that monitors and controls all fuel injectors 12 of system 10. Alternatively, ECM 80 may be implemented as a plurality of distributed control modules in communication with each other.

ECM 80 may be enabled, via programming, to generate commands that control fuel injection events. These commands may result in the supply of electrical energy (e.g., as a desired current waveform), the electrical energy resulting from the commands being monitored by ECM Current monitored by ECM 80 may be supplied, via respective drive circuits, to solenoids 40 and 42. Current monitored by ECM 80 may also include currents generated by movement of spill valve member 25 and control valve member 26 to respective resting positions. In particular, ECM 80 may be programmed to identify valve arrival times (e.g., times when spill valve member 25 and valve member 26 reach respective actuated positions) based on monitored actuation currents. ECM 80 may be programmed to identify valve return times of spill valve member 25 and valve member 26 based on currents that are induced by movement of spill valve member 25 and control valve member 26.

ECM 80 may further be configured, via programming, to adjust future fuel injector commands based on one or more sensed arrival times or one or more sensed return times. In particular, ECM 80 may be configured to adjust future fuel injector commands based on four fuel injector measurements: an arrival time of spill valve member 25 at which spill valve member 25 reaches a fully-actuated position after travelling from a resting position, an arrival time of valve member 26 at which control valve member 26 reaches a fully-actuated position after travelling from a resting position, a return time when spill valve member 25 returns to the resting position from the fully-actuated position, and a return time when valve member 26 returns to the resting position from the fully-actuated position.

ECM 80 may embody a single microprocessor or multiple microprocessors that receive inputs and generate outputs. ECM 80 may include memory 82, as well as a secondary storage device, processor 84, such as a central processing unit, or any other means for accomplishing a task consistent with the present disclosure. Memory 82 or a secondary storage device associated with ECM 80 may store data and software to allow ECM 80 to perform its functions, including the functions described with respect to method 300, described below. In particular, memory 82 may store instructions that, when executed by one or more processors 84, enable one or more processors 84 to perform each of the current monitoring, fuel injector command generation, and fuel injector command adjustment functions described herein. Numerous commercially available microprocessors can be configured to perform the functions of ECM 80. Various other known circuits may be associated with ECM 80, including signal-conditioning circuitry, communication circuitry, and other appropriate circuitry.

ECM 80 may be configured to monitor a plurality of fuel injectors and change fuel injection timings without the need for a fuel injector trim file. As used herein, a "trim file" includes digital files, as well as unique codes (including alphanumeric codes) that identify a unique fuel injector 12, or a plurality of fuel injectors 12. A unique trim file may identify exactly one single (i.e., one of a kind) fuel injector 12. These trim files may be generated by evaluating each fuel injector under multiple different conditions. Each trim file may be used to make one or more adjustments to a standard current waveform that are necessary for the fuel injector to output fuel at a desired timing and/or in a desired quantity.

A unique trim file may be used, for example, during initial installation of one or more fuel injectors to an engine. During installation, an operator may note a unique identifier (e.g., a serial code or unique trim code). An electronic device, such as a computer system, may then be placed in communication with ECM 80. Using the electronic device, the operator can identify a trim file and/or supply the unique identifier to ECM 80. Based on this, ECM 80 may make initial adjustments to the standard waveform. ECM 80 may then make supplemental adjustments based on the detected performance of injector 12.

A "simple trim file" or "simplified trim file" includes digital files and/or a code that is applicable to a plurality of fuel injectors. A simple trim file may enable ECM 80 to compensate for the particular flow rate of injector openings 35 of nozzle 33. For example, a simplified trim file may be generated based on a steady state flow measurement through nozzle 33 of injector 12. In contrast, a unique trim file may compensate for manufacturing differences in the valves of injector 12, including differences in valve member travel, friction, spring forces, generated magnetic force, and others, by performing testing under various conditions. By being programmed to operate without the use of any trim file or with a simple trim file (e.g., by detecting operation of arrival and return timing for a pair of solenoid valves) ECM 80 may enable reduction or elimination of this testing.

FIGS. 2A-2D illustrate exemplary current waveforms 102, 104, 106, and 108 that are monitored by ECM 80 during one or more fuel injection events. A fuel injection event may include a single fuel injection or a multi-stage fuel injection (e.g., an injection containing pilot, main and/or post portions that may overlap or follow closely in sequence). Each of waveforms 102, 104, 106, and 108 are exemplary, and not necessarily to scale. In each waveform, the vertical axis represents current amplitude, while the horizontal axis represents time.

A first waveform 102 may represent current through control valve solenoid 42 that is monitored by ECM 80 to detect a return time of control valve member 26. A second waveform 104 may represent current through spill valve solenoid 40 that is monitored by ECM 80 to detect a return time of spill valve member 25. A third waveform 106 may represent current through control valve solenoid 42 that is monitored to detect an arrival (or full actuation) time of control valve member 26. A fourth waveform 108 may represent current through spill valve solenoid 40 that is monitored to detect arrival time of spill valve member 25.

Each of currents represented in FIGS. 2A-2D may, with the exception of induced currents 118 and 130, represent currents that are supplied to an injector solenoid (and corresponding circuitry) in response to commands from ECM 80. The first and second waveforms 102 and 104 may be associated with one or more strategies that allow valve return detection via induced current. The energy supplied to solenoids 40 and 42 as waveforms 102 and 104 may be provided via a high-voltage power supply. The third and fourth waveforms 106 and 108 may also represent energy supplied to solenoids 40 and 42, the energy being supplied with a battery-level voltage (and thus, a battery-level current) from a battery, to enable detection of valve arrival.

Figure 2A:
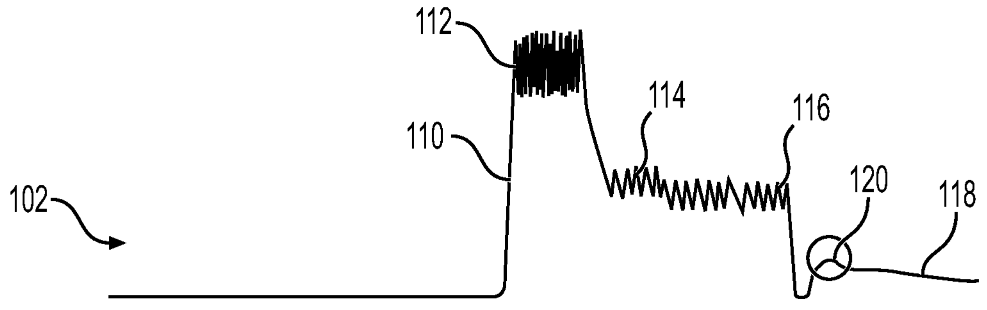
FIGS. 2A-2D are charts showing exemplary current values for a pair of valves for the system of FIG. 1, according to aspects of the disclosure.

In FIG. 2A, waveform 102 may begin with an initial current rise 110 that transitions to a maximum pull-in current 112. This current may be a driving current that acts to actuate control valve member 26 to the injection position. First hold-in tier 114 and second (e.g., minimum) hold-in tier 116 may hold control valve member 26 in the injection position to facilitate the injection of fuel. Following a current drop at the end of hold-in tier 116, movement of valve member 26 may generate induced current 118. A peak 120 of this induced current 118 may be identified by ECM 80 to determine the return time of valve member 26 to the resting non-injection position.

Figure 2B:
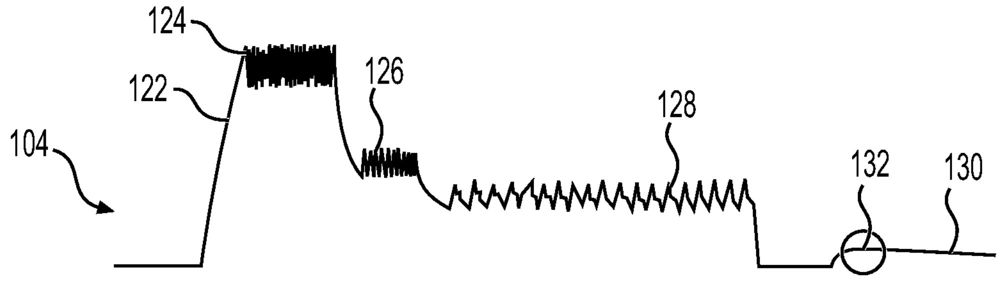

In FIG. 2B, waveform 104 may, like waveform 102 for control valve 24, begin with an initial current rise 122 that transitions to a maximum pull-in current 124. This current may act to actuate spill valve member 25. A first hold-in tier 126 and second, minimum hold-in tier 128 may retain control valve member 26 in the actuated injection position to facilitate the pressurization of fuel, enabling injection when valve member 26 is in the injection position. Following a current drop at the end of hold-in tier 128, movement of valve member 25 may generate induced current 130. A peak 132 of induced current 130 may enable ECM 80 to identify the return time of valve member 25 to the resting open position.

Figure 2C:
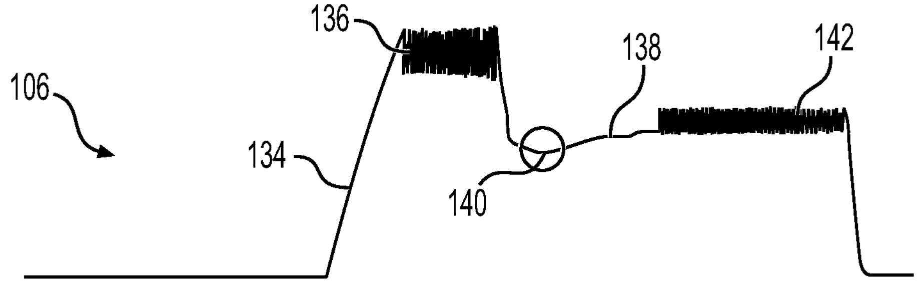

In FIG. 2C, waveform 106 may represent current supplied to control valve solenoid 42. Waveform 106 may be applied in a manner that enables ECM 80 to identify the arrival time of control valve member 26 to the injection position. Waveform 106 may include a current rise 134, a pull-in current 136, and a chopped hold-in current 142. Current levels 134, 136, and 142 may serve functions similar to those described above for initial current rise 110, maximum pull-in current 112, and hold-in tier 116, respectively. Waveform 106 may also include a non-chopped hold-in tier 138, which, unlike pull-in current 136 and chopped hold-in current 142, may be supplied without forming alternating maxima and minima associated with chopped current. This may be performed by suppling energy with a battery instead of with a high-voltage power supply. Non-chopped hold-in tier 138 may include a non-chopped minimum current 140. This local minimum current 140 may indicate the arrival time of control valve member 26 to the injection position.

Figure 2D:
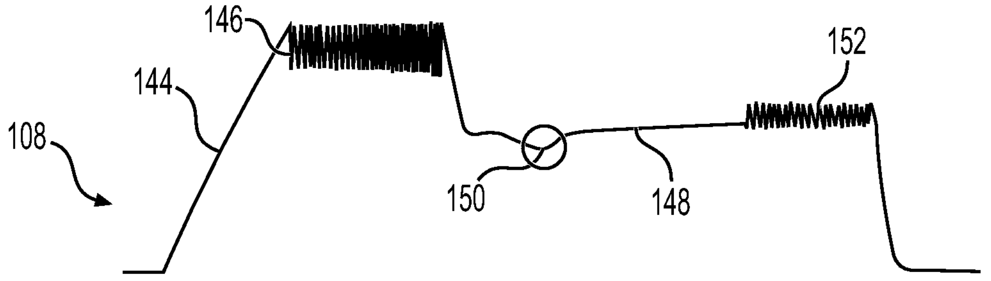

In FIG. 2D, waveform 108 represents current supplied to spill valve solenoid 40. Waveform 108 may enable ECM 80 to identify the arrival time of spill valve member 25 to the actuated position in which fuel is pressurized with piston 14. Waveform 108 may include a current rise 144, a pull-in current 146, and a chopped hold-in current 152, which are analogous to initial current rise 122, maximum pull-in current 124, and minimum hold-in tier 128 (FIG. 2B). Waveform 108 may also include a non-chopped hold-in tier 148, supplied by a battery to enable detection of non-chopped minimum current 150 which indicates the arrival time of spill valve member 25 to the closed position.

ECM 80 may be programmed to perform one or more strategies to enable accurate current monitoring and detection of valve actuation and valve returns. For example, regarding the detection of peaks 120 and 132, ECM 80 may be programmed to modify waveform 102 and/or second waveform 104 to improve the detection accuracy for peak 120, peak 132, or both.

In one exemplary strategy, ECM 80 may delay or advance the timing at which the induced current is monitored by ECM 80 for the presence of a current peak. This may include, for example, adjusting a timing at which a current draw-down is performed (e.g., increasing a period of time of this draw-down to minimize the effect of induced current of control valve member 26 on the circuit for spill valve solenoid 40). This may adjust (e.g., delay or accelerate) the beginning of monitored induced current 118 and 130.

ECM 80 may also apply a monitoring window that enables ECM 80 to ignore early (or late) current peaks outside of this window. For example, ECM 80 may ignore one or more early peaks in currents 118 and 130 (e.g., peaks that tend to occur before peaks 120 and 132 as shown in FIGS. 2A and 2B).

As yet another strategy, ECM 80 may impose a limit or restriction on the amount of current adjustment for one or more current waveforms 102 and 104 during which a measurement will be taken. For example, based on prior valve measurements, current engine conditions, and other variables, ECM 80 may adjust or trim current to achieve a desired valve return time associated with the injection of a desired amount of fuel. However, for one or more measurements, ECM 80 may reduce or eliminate this adjustment, ensuring that the current adjustment satisfies an adjustment limit. This adjustment limit may limit, for example, a timing adjustment associated with the supply of current. Following one or more measurements, ECM 80 may return to a desired adjustment (or trim) for fuel injections, even if doing so exceeds the limit applied during the measurements.

In some aspects, ECM 80 may employ one, two, or all three of these strategies to facilitate valve return measurements. In some aspects, these strategies may be applied in a manner that does not significantly impact valve actuation, magnetic field strength of solenoids 40 and 42, and fuel injection. For example, at least one of these strategies may be applied without altering maximum pull-in current 112, first hold-in tier 114, maximum pull-in current 124, first hold-in tier 126, or minimum hold-in tier 128. In some aspects, relatively minor adjustments may be made to the end of current associated with hold-in tier 116 and/or minimum hold-in tier 128. These adjustments may be applied to a small number of injections and/or may have a relatively small (e.g., negligible) effect on the amount of fuel injected. This may reduce or eliminate the impact of these strategies on engine performance.

Regarding FIGS. 2C and 2D, ECM 80 may employ one or more strategies to improve detection accuracy of current minimum 140, current minimum 150, or both, associated with valve arrival timings. A strategy for measuring valve arrival times may differ from the strategy or strategies employed for measuring valve return time. However, like the strategy or strategies employed for measuring valve return time, these strategies may not significantly impact valve actuations and/or magnetic field strength. Thus, strategies for measuring valve arrival times may be employed when it is desirable to detect the arrival time of spring member 22, control valve member 26, or both.

Exemplary strategies for valve arrival time measurement may include taking actions to avoid cross-talk or solenoid interference when ECM 80 supplies current to both spill valve solenoid 40 and control valve solenoid 42. For example, ECM 80 may avoid the use of a chopped current during a window of time when spill valve member 25 or control valve member 26 is expected to reach an actuated position, instead applying non-chopped current 138 or 148. The non-chopped current may be supplied following a chopped pull-in current 136, 146. Specifically, non-chopped current may be supplied during a window of time that begins once the current reaches a predetermined level that is lower than current 136 and 146, respectively.

In some aspects, non-chopped currents 138 and 148 may be applied for one of solenoids 40 and 42 in a particular injection. Additionally or alternatively, currents 138 and 148 may be supplied for both solenoids 40 and 42 simultaneously (e.g., to enable detection of arrival times for both valves in a single fuel injection).

While it may be possible for ECM 80 to identify current peaks 120 and 132, and to identify current minimums 140 and 150 in a single injection event, these respective identifications may be made in multiple different injections, if desirable for economy of electrical energy, accuracy of the measurements (e.g., to avoid interference or cross-talk), or current engine conditions. For example, the four measurements that respectively correspond to current peak 120, current peak 132, current minimum 140, and current minimum 150 may be made in four different injection events (one measurement per fuel injection), three different injection events (two measurements in one fuel injection and one measurement occurring in a second fuel injection), or two different injection events (two measurements being made in two respective fuel injections).

INDUSTRIAL APPLICABILITY

System 10 may be useful in various internal combustion engine systems including multiple solenoid-driven valves. System 10 may be utilized for generating power in a stationary machine (e.g., a generator or other electricity-generating device), in a mobile machine (e.g., an earthmoving device, a hauling truck, a drilling machine, etc.), or in other applications in which it is beneficial to monitor and control current applied to electronically-controlled fuel injector valves.

At the initial stage of a fuel injection event, a cam lobe (not shown) may drive piston 14 in a manner that pressurizes fuel within pressurized fuel passage 18 (FIG. 1). Spill valve 20 may be actuated with spill valve armature 44 by supplying current to spill valve solenoid 40, moving and holding spill valve member 25 in the closed position. This position of spill valve member 25 may enable pressurization of fuel within injector 12. Control valve 24 may be actuated with control valve armature 46 by supplying current to control valve solenoid 42 during this fuel pressurization, allowing fluid to drain from control chamber 36 so that pressurized fluid in injection chamber 32 lifts control valve member 30 and fuel is injected via injector openings 35 of nozzle 33. To end injection, spill valve solenoid 40 and control valve solenoid 42 may be de-energized.

During fuel injection events (e.g., pressurization and injection of fuel during pilot, main, and/or post-injections), ECM 80 may monitor currents supplied to spill valve solenoid 40 and control valve solenoid 42, respectively. Based on identified valve actuation times and valve return times, ECM 80 may adjust current waveforms for future fuel injections. These adjustments may modify the amount of fuel that is actually injected via injector openings 35, improving the accuracy of fuel injection and compensating for gradual changes that may occur to injector 12 over time. These adjustments may also facilitate installation of a new injector 12 in an internal combustion engine, without the need to provide a trim code. For example, adjustments that can be encoded with the trim code and/or retrieved by a control unit can instead be performed by ECM 80 as described with respect to method 300 below. In some aspects, while valve actuation and valve return measurements may enable the complete omission of any trim code, if desired, a simple trim code that enables compensation for steady-state nozzle flow rate may be provided to ECM 80. This may enable ECM 80 to perform an initial calibration that adjusts for differences in nozzle geometry, without the need to adjust for variance in the spill or control valves with a trim file.

Figure 3:
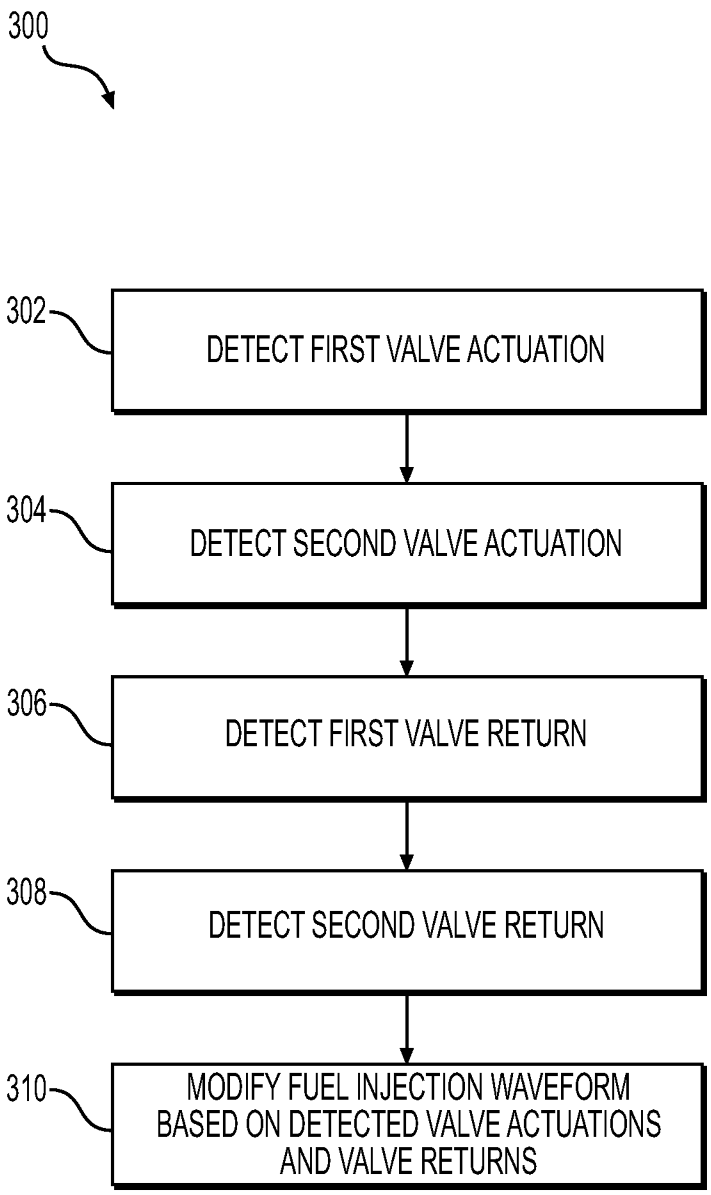
FIG. 3 is a flowchart depicting an exemplary fuel injection method, according to aspects of the disclosure.

FIG. 3 shows a flowchart illustrating an exemplary fuel injection method 300, according to aspects of the disclosure. In some aspects, method 300 may be performed as part of an initial installation of one or more injectors 12. In particular, method 300 may enable the installation of injector 12 without the use of a trim file and without the use of a trim code, especially unique trim files and/or trim codes. However, in some aspects, method 300 may involve the use of a simplified trim code. Method 300 may enable the elimination of a trim code as adjustments can be made by detecting valve arrival times and valve return times. These times may be used to adjust one or more of a maximum amplitude of solenoid current, an average amplitude of solenoid current, a start time of solenoid current, an end time of solenoid current, a total time of solenoid current, or other aspects of a baseline (e.g., un-adjusted) waveform. These adjustments to the baseline waveform may correspond to adjustments that would otherwise be performed with the trim code and/or trim file.

A first step 302 of method 300 may include detecting a valve actuation of a first valve of injector 12, such as control valve 24, with ECM 80. For example, ECM 80 may identify current minimum 140 (FIG. 2C). A second step 304 may include detecting valve actuation of a second valve of injector 12, such as spill valve 20, with ECM 80. Step 304 may include identifying current minimum 150 (FIG. 2D) with ECM 80, peak 132 being indicative of the actuation of spill valve 20.

Steps 302 and 304 may include the use of one or more strategies to enable accurate detection of minimum 140 and minimum 150 in a multi-solenoid injector 12. In at least some configurations, ECM 80 may apply non-chopped current(s) 138 and 148 via a battery, as described above.

A step 306 of method 300 may include detecting a valve return of the first valve (control valve 24), with ECM 80. For example, ECM 80 may identify current peak 120 (FIG. 2A). Step 308 may include detecting the return of the second valve member, such as spill valve member 25, with ECM 80, based on current peak 132.

Steps 306 and 308 include the use of one or more strategies to enable accurate detection of peak 120 and peak 132 in a multi-solenoid injector 12. These strategies may include one or more of: adjusting a timing at which a current draw-down is performed, applying a monitoring window, and/or imposing a limit or restriction on the amount of current adjustment.

A step 310 may include modifying one or more fuel injection waveforms based on the actuation and return timings detected in steps 302, 304, 306, and 308. Step 310 may include modifying one or more of: a maximum amplitude of solenoid current (e.g., a highest current level during a pull-in tier 112, 124, 136, 146 or a hold-in tier 114, 116, 126, 128, 142, 152), an average amplitude of solenoid current (e.g., an average amplitude of one pull-in or hold-in tier, or an average amplitude of multiple tiers), a start time of solenoid current (e.g., the time at which currents 110, 122, 134, 144 begin), an end time of solenoid current, or a total time of solenoid current. This modification can be made by comparing expected valve arrival times and expected valve return times to the detected valve arrival and return times, respectively.

Step 310 may include limiting a maximum change that ECM 80 permits to any of the above-described currents. This may, for example, avoid overcompensation when an abnormal condition occurs in injector 12. For example, a change in an end time of solenoid current may be limited to a predetermined trim range, this predetermined trim range representing an earliest permitted end time of current and a latest permitted end time of current. If desired, these permitted end times may correspond to a maximum permissible error, as described below, that provides the basis for determining that a valve of injector 12 is behaving abnormally. As understood, a predetermined trim range may be applied to each factor modified in step 310, such as maximum amplitude, average amplitude, start time, and total time of current.

Step 310 may be performed without the use of a fuel injector trim file. Thus, each of the above-described modifications may be performed solely on the basis of four types of measurements: the arrival times of spill and control valves, and the return times of the spill and control valves. In embodiments in which a trim file is desired, a simplified trim file or trim code (e.g., a 4-digit code) may be input to ECM 80. This simple trim file may provide ECM 80 with steady state flow information for injector openings 35 of nozzle 33. This simplified trim file may be applicable to a plurality of fuel injectors (e.g., fuel injectors with similar or identical nozzles), in contrast to a unique trim code or unique trim file.

Step 310 may also include generating a notification indicative of abnormal behavior of one or more valves of injector 12. For example, each actual valve arrival indicated by minimum 140 and minimum 150 may be compared to an expected valve arrival time. When the difference between the actual arrival time and the expected arrival time is greater than a predetermined maximum permissible error, ECM 80 may determine that the valve is sticking, the electrical supply is operating incorrectly, or that other issues exist. In a similar manner, ECM 80 may compare the actual return timings detected based on peaks 120 and 132 to respective expected return times. When the difference between the actual and expected return times are greater than a maximum permissible error, ECM 80 also determine that an error exists. In response to identifying this error, ECM 80 may generate a notification to an operator of system (e.g., an operator of a machine in which system 10 is installed), a supervisory system, etc.

As indicated above, one or more of steps 302, 304, 306, 308, and 310 may be performed as part of a process for initial installation of injector 12. However, if desired, each of these steps may be repeated at one or more times following installation and initial calibration. This may enable ECM 80 to compensate for changes in the performance of each injector 12 over time, as well as identify abnormal performance in injector 12. Additionally, while steps 302, 304, 306, 308, and 310 were described in an exemplary order, as understood, one or more of these steps may be performed in a different order, or in a partially- or fully-overlapping manner.

The disclosed method and system may avoid the need for an end user, system assembler, or manufacturer, to install a trim file on a controller for an internal combustion engine that employs electronically-controlled fuel injectors. This may, in turn, reduce the need for database systems to store testing results, trim files, and related information. At least some configurations of the disclosed system and method may be useful to enable the use of simplified trim files. The disclosed system and method may eliminate the potential for installation of the incorrect trim file, or may mitigate the effect of an incorrectly-installed trim file, and may enable a control unit to compensate for manufacturing variations, and subsequently for changes in fuel injector operation over time, such as wear, valve sticking, etc. Additionally, the disclosed system and method may simplify the end-of-line process for fuel injector manufacturing by reducing or eliminating the need for valve testing used to generate trim files. The ability to detect valve arrival and valve return timings for a pair of valves for a fuel injector may also enable identification of abnormal fuel injector operation or the need to replace a fuel injector.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A fuel injection method, comprising:
- detecting an actuation timing of a first valve of a fuel injector;
- detecting an actuation timing of a second valve of the fuel injector;
- detecting a return timing of the first valve of the fuel injector based on induced current that is generated by motion of the first valve;
- detecting a return timing of the second valve of the fuel injector based on induced current that is generated by motion of the second valve; and
- for one or more fuel injection waveforms that are generated according to commands from an electronic control module for injecting fuel, modifying at least one of:
  - a maximum amplitude of solenoid current,
  - an average amplitude of solenoid current,
  - a start time of solenoid current,
  - an end time of solenoid current, or
  - a total time of solenoid current,
- the modification being performed based on the actuation timing of the first valve, the actuation timing of the second valve, the return timing of the first valve, and the return timing of the second valve.

2. The method of claim 1, wherein the first valve is a control valve.

3. The method of claim 2, wherein the second valve is a spill valve.

4. The method of claim 3, wherein the fuel injector further includes an injection valve that is controlled by an actuation of the spill valve and an actuation of the control valve.

5. The method of claim 1, further including limiting an amount of the modification to the start time or to the end time of solenoid current to a predetermined trim range.

6. The method of claim 1, wherein modifying the solenoid current is performed without use of a trim code and without use of a trim file during installation of the fuel injector.

7. The method of claim 1, further including receiving, at the electronic control module, a fuel injector trim code, the fuel injector trim code being the same for a plurality of different fuel injectors.

8. The method of claim 1, wherein the actuation timing of the first valve is detected based on a current drop and the return timing of the first valve is detected based on a current increase.

9. The method of claim 8, wherein the current drop is detected during a first fuel injection waveform and the current increase is detected during a second fuel injection waveform.

10. The method of claim 8, wherein the current drop and the current increase are detected during a single fuel injection event.

11. A fuel injection system, comprising:
- a mechanically-actuated fuel injector having:
  - a first electronically-controlled valve;
  - a second electronically-controlled valve; and
  - a nozzle configured to inject fuel; and
- an electronic control module configured to, without the use of a fuel injector trim file:
  - identify an actuation timing of a spill valve based on actuation current that is supplied to a spill valve solenoid and monitored with the electronic control module,
  - identify an actuation timing of a control valve based on actuation current that is supplied to a control valve solenoid and monitored with the electronic control module,
  - identify a return timing of the spill valve based on induced current that is generated by motion of the spill valve and monitored with the electronic control module,
  - identify a return timing of the control valve based on induced current that is generated by motion of the control valve and monitored with the electronic control module, and
  - modify a current timing for the spill valve and for the control valve in a subsequent injection based on the identified actuation timings and the identified return timings.

12. The fuel injection system of claim 11, wherein the identified actuation timings, and the identified return timings, are made for a single fuel injector containing the spill valve, the control valve, and an injection valve.

13. The fuel injection system of claim 11, wherein the electronic control module is further configured to generate the actuation current as a non-chopped current.

14. The fuel injection system of claim 11, wherein the electronic control module is further configured to modify a timing of the induced current to identify the return timing of the control valve or to identify the return timing of the spill valve.

15. A fuel injector control module, comprising:
- a memory storing instructions; and
- one or more processors that, when executing the instructions, are programmed to performs functions including:
  - detecting an actuation timing of a first valve of a fuel injector,
  - detecting an actuation timing of a second valve of the fuel injector,
  - detecting a return timing of the first valve of the fuel injector,
  - detecting a return timing of the second valve of the fuel injector, and
  - for one or more future fuel injection waveforms generated according to commands from an electronic control module for injecting fuel, changing at least one of:
    - a maximum amplitude of solenoid current,
    - an average amplitude of solenoid current,
    - a start time of solenoid current,
    - an end time of solenoid current, or
    - a total time of solenoid current, the change being based on the actuation timing of the first valve, the actuation timing of the second valve, the return timing of the first valve, and the return timing of the second valve.

16. The control module of claim 15, wherein the first valve is a control valve and wherein the second valve is a spill valve.

17. The control module of claim 15, wherein the control module is programmed to perform the functions without the use of a fuel injector trim file and without the use of a fuel injector trim code.

18. The control module of claim 15, wherein the functions include receiving a simple fuel injector trim code.

19. The control module of claim 15, wherein, when the start time or the end time of solenoid current are changed, an amount of the change is limited to a predetermined range.

20. The control module of claim 15, wherein the functions include modifying the start time of solenoid current or the end time of solenoid current for the first valve and for the second valve.

* * * * *